United States Patent [19]
Bahn

[11] Patent Number: 5,739,613
[45] Date of Patent: Apr. 14, 1998

[54] FLAT THREE-PHASE RELUCTANCE TYPE MOTOR

[75] Inventor: Itsuki Bahn, Nerima-ku, Japan

[73] Assignee: Kabushikigaisha Sekogiken, Tokyo, Japan

[21] Appl. No.: 656,304

[22] PCT Filed: Nov. 2, 1995

[86] PCT No.: PCT/JP95/02245

§ 371 Date: Jun. 14, 1996

§ 102(e) Date: Jun. 14, 1996

[87] PCT Pub. No.: WO96/15582

PCT Pub. Date: May 23, 1996

[30] Foreign Application Priority Data

Nov. 9, 1994  [JP]  Japan ................... 6-310037
Dec. 15, 1994 [JP]  Japan ................... 6-337395

[51] Int. Cl.[6] .................................. H02K 17/00
[52] U.S. Cl. ............... 310/166; 310/268; 310/266; 310/67 R; 310/121; 310/264; 310/265; 310/114
[58] Field of Search ................... 310/166, 268, 310/266, 114, 67 R, 121, 264, 254; 360/121, 264

[56] References Cited

U.S. PATENT DOCUMENTS

| | | | |
|---|---|---|---|
| 3,189,770 | 6/1965 | Henry-Baudot | 310/156 |
| 5,138,244 | 8/1992 | Bahn | 318/701 |
| 5,214,365 | 5/1993 | Bahn | 318/701 |
| 5,218,251 | 6/1993 | Allwine | 310/49 R |
| 5,254,892 | 10/1993 | Boseman et al. | 310/49 R |
| 5,260,635 | 11/1993 | Bahn | 318/701 |
| 5,406,184 | 4/1995 | Bahn | 318/701 |

FOREIGN PATENT DOCUMENTS

| | | |
|---|---|---|
| 1-13590   | 5/1989 | Japan . |
| 1-194888  | 8/1989 | Japan . |
| 1-286794  | 8/1989 | Japan . |
| 5-219788  | 8/1993 | Japan . |

*Primary Examiner*—Thomas M. Dougherty
*Assistant Examiner*—Timothy A. Williams
*Attorney, Agent, or Firm*—Staas & Halsey

[57] ABSTRACT

A three-phase reluctance type motor flat in shape and capable of generating a large output torque and rotating at high speeds, comprising a flat stationary armature (16) having a circumferential surface provided with three multiplied by integral number of magnetic poles wound by first, second and third phase armature coils, salient poles of a magnetic rotor (1) fixed to the inside of the outer periphery of a cup-shaped rotor (3), and a current supply control circuit for obtaining first, second and third phase position detecting signals responsive to the position of the salient poles and for quickly supplying current to the first, second and third phase armature coils based on these position detecting signals, so as to realize a high-speed rotation.

6 Claims, 8 Drawing Sheets

FLAT THREE-PHASE RELUCTANCE TYPE MOTOR

TECHNICAL FIELD

The present invention relates to a three-phase reluctance type motor which is flat in shape and capable of generating a large output and rotating at high speeds, preferably to be used as a drive source for a floppy disk and a hard disk.

BACKGROUND ART

The drive motor for a floppy disk or a hard disk is normally required to be so flat that the number of magnetic poles is restricted to approximately 15, and the width of a rotary magnet is required to be reduced to approximately 3 mm. Thus, such a drive motor has disadvantage in that its output torque is so small and its operating efficiency drops largely as its rotational speed increases.

However, when a drive motor is reluctance type, a larger output can be obtained even when it is made flat. However, a reluctance-type motor is generally characterized in that the magnetic path of armature coils, formed by salient poles and magnetic poles, is almost closed, enlarging its inductance. This enlarged inductance will increase the amount of magnetic energy stored in or discharged from magnetic poles or salient poles, and also will increase the repetition frequency of such energy storage and discharge during one complete revolution of the rotor. Thus, a reluctant-type motor has an advantage of being capable of producing a large output but has a disadvantage of being incapable of producing a high revolution speed.

DISCLOSURE OF INVENTION

An object of the present invention is to provide a flat, three-phase, reluctance type motor capable of generating a large output torque and rotating at high speeds.

In order to accomplish above purpose, the present invention provides a flat, three-phase, half-wave, reluctance type motor, comprising a flat stationary armature having a circumferential surface on which there are disposed three or its integral multiple number of magnetic poles wound by first, second and third phase armature coils, salient poles of a magnetic rotor fixed to the inside of the outer periphery of a cup-shaped rotor, a ball bearing supporting a rotational shaft of the cup-shaped rotor so as to allow the outer peripheral surface of the magnetic poles confronting the inner peripheral surface of the salient poles through a slight air gap therebetween to rotate when the rotational shaft is rotated, and a current supply control circuit for enabling the motor to rotate at a high speed by quickly controlling the supply of current to the first, second and third-phase armature coils in response to the position detection signals to be generated by detecting the positions of salient poles.

Furthermore, according to the present invention, it will be possible to provide a three-phase, full-phase, reluctance type motor by adding another set of a stationary armature and a rotor to the above-described three phase, half-wave, reluctance type motor. In this case, the torque ripple can be reduced by offsetting the phase of magnetic poles of one stationary armature by a predetermined electric angle from the phase of corresponding magnetic poles of the other stationary armature.

The current supply control circuit for supplying current to armature coils comprises an electric circuit designed to sharply decrease the flow of current through the armature coil by allowing the magnetic energy stored in the armature coil to flow, through a diode, into a small-capacitance capacity for being charged therein, when the supply of current to the armature coil is stopped, and, another electric circuit designed for sharply building up current by allowing the magnetic energy stored in the small-capacitance capacitor to flow into the armature coil simultaneously with start of current supply when the armature coil is supplied with the current.

With the above-described arrangement, it becomes possible to obtain a three-phase reluctance type motor flat in shape and being capable of generating a large output torque and rotating at high speeds.

BEST MODE FOR CARRYING OUT THE INVENTION

First, a three-phase reluctance type motor in accordance with a first embodiment of the present invention will be explained with reference to FIGS. 1 to 11.

Figure 1:
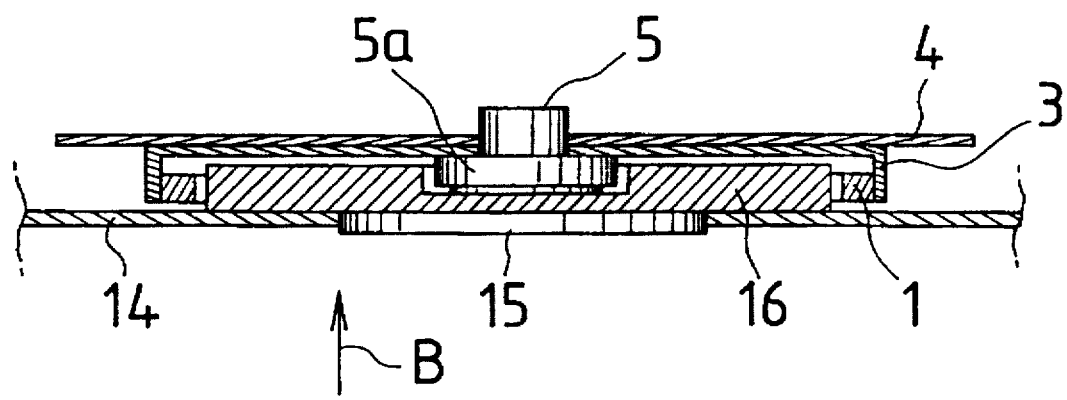
FIG. 1 is a transversal cross-sectional view showing a three-phase reluctance type motor in accordance with a first embodiment of the present invention.

In FIG. 1, reference numeral 14 represents a substrate, such as that of a printed circuit board, which is securely mounted on an electric motor in accordance with the embodiment of the present invention. The substrate 14 has a circular hole into which a disk-shaped protrusion 15 formed at the lower end of a stationary armature 16 is fitted.

Reference numeral 3 represents a rotor made of metal (e.g. iron plate) which is formed into a cup shape. A magnetic rotor 1 is securely fixed inside the outer peripheral flange of the rotor 3. Details of the structure of rotor 3 will be explained with reference to FIG. 4. A circular plate 4, mounted on the rotor 3, rotates in synchronism with rotor 3. A load, such as a floppy disk, is mounted on the circular plate 4.

Circular disk 4 and rotor 3 are fixed at their central portions to a rotational shaft 5. The rotational shaft 5 is supported by a ball bearing 5a, details of which will be explained with reference to FIGS. 2 and 3.

Figure 2:
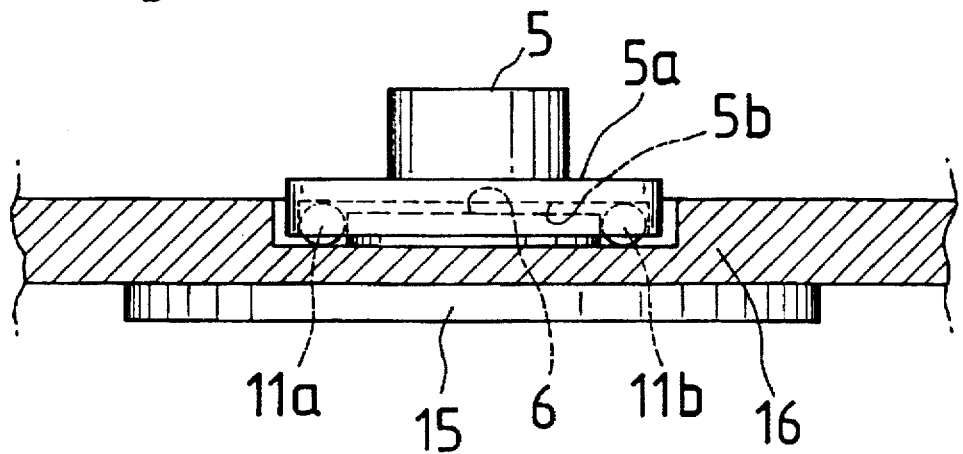
FIG. 2 is a view illustrating a ball bearing portion adopted in the motor shown in FIG. 1.

In FIG. 2, stationary armature 16 has a circular recess on the upper surface thereof. At the center of circular recess, there is formed a cylindrical protrusion 6. The ball bearing 5a, formed into a cup shape, is coupled with the cylindrical protrusion 6. A plurality of steel balls 11a, 11b are interposed between the outer periphery of cylindrical protrusion 6 and the inner periphery of bearing 5a, constituting the ball bearing mechanism. Reference numeral 5b represents a concave portion of bearing 5a. With this arrangement, rotor 3 is rotatably supported on stationary armature 16.

Figure 3:
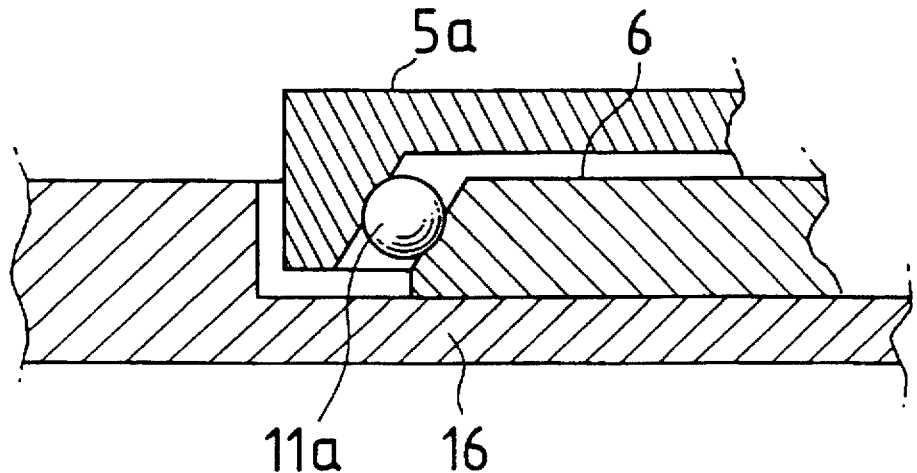
FIG. 3 is a view illustrating another ball bearing portion different from the one shown in FIG. 2.

The ball bearing shown in FIG. 2 can be replaced by another type of ball bearing shown in FIG. 3, since they are equivalent in their function of rotatably supporting rotor 3 on stationary armature 16. FIG. 3 is an enlarged view showing the part of another type ball bearing. The bearing 5a has an outer peripheral portion whose inside wall is formed into a slant surface. On the other hand, protrusion 6 has an outer peripheral portion formed into a slant surface. A steel ball 11a is fitted into the gap between these slant surfaces.

Figure 4:
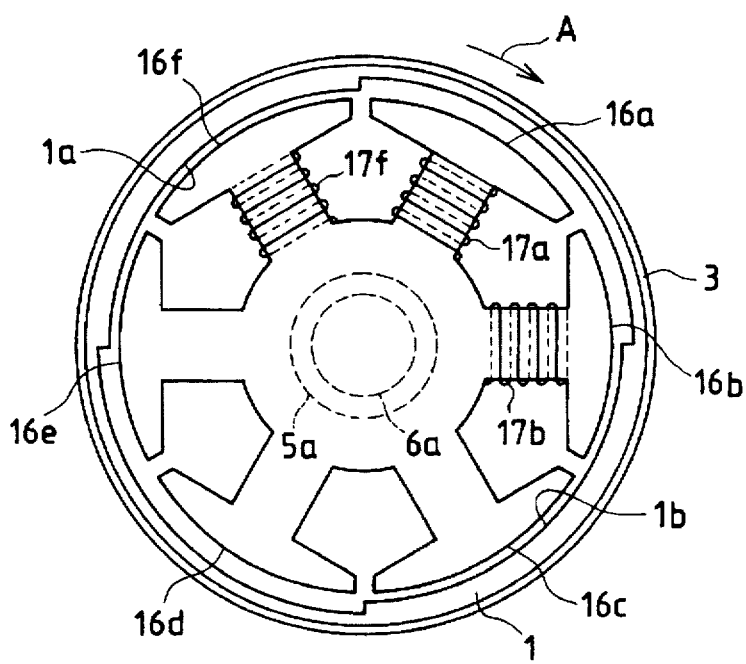
FIG. 4 is a view showing the motor, seen from the direction of an arrow B in FIG. 1.

Next, both the stationary armature and the rotor will be explained with reference to FIG. 4.

The stationary armature 16 has magnetic poles 16a, 16b, - - - , 16f each having the width of 120 degrees in terms of electric angle. The core of stationary armature 16 is constituted by laminating four layers of 0.3 mm thick silicon steel sheets. Armature coils 17a, 17b, - - - , 17f are wound around magnetic poles 16a, 16b, - - - , 16f, respectively, as shown by dotted lines in the drawing. After finishing winding of these coils, stationary armature 16 is molded in plastic and shaped into a disk as shown by reference numeral 16 in FIG. 1.

Magnetic rotor 1, formed by laminating layers of silicon steel sheets to a thickness equal to that of the core of the armature coil, is fixed to the inside wall of the outer peripheral flange of rotor 3. The magnetic rotor 1 has salient poles 1a, 1b, the width of which is 180 degrees in terms of electric angle to separate salient poles by 180 degrees.

The present invention can also be worked in the case where number of salient poles 1a, 1b is three or four and number of magnetic poles 16a, 16b is nine or twelve.

Figure 5:
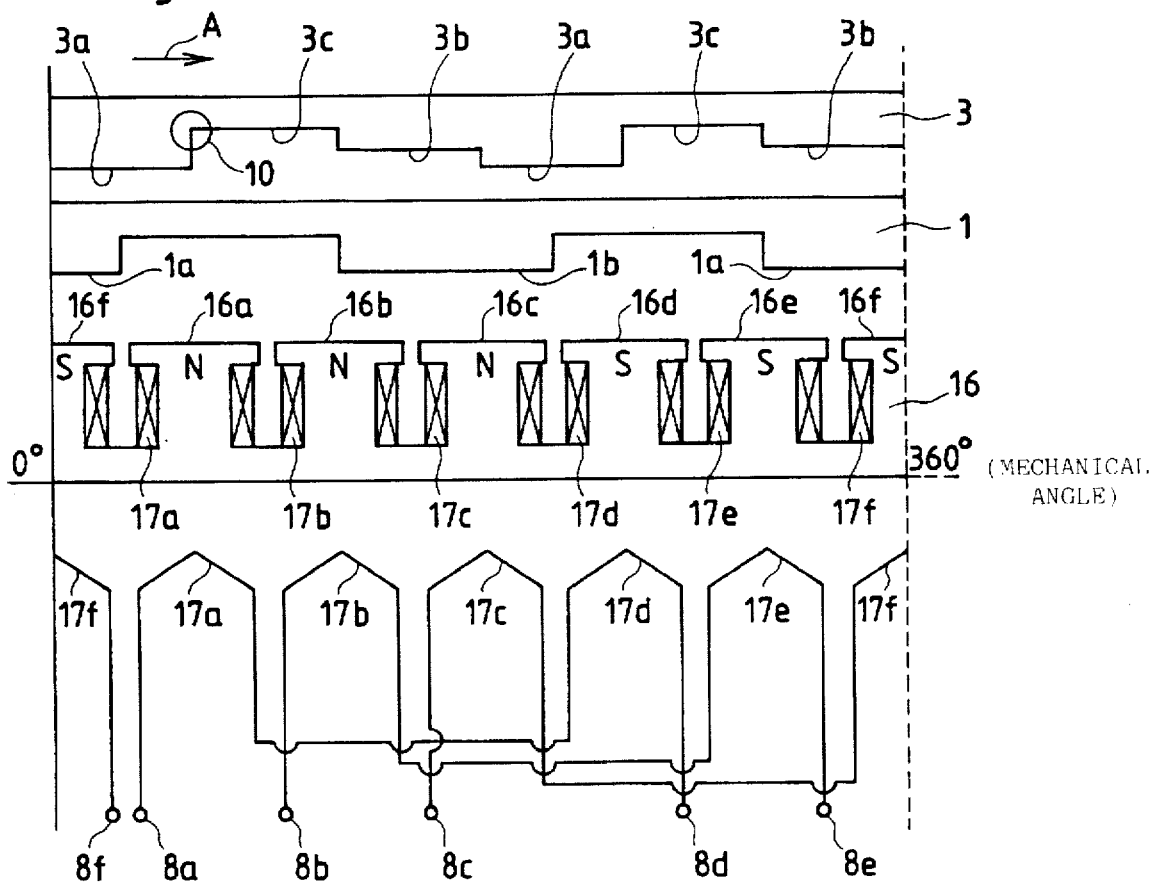
FIG. 5 is a development showing the stationary armature and the magnetic rotor of the motor shown in FIG. 4.

When current is supplied to the armature coils 17a, 17b - - - , the salient poles 1a and 1b, which are magnetic substance, will be attracted by the magnetic attraction force to cause the rotor 3 to turn in the direction of an arrow A. This will be explained in more detail with reference to FIG. 5. FIG. 5 is a development showing magnetic rotor 1, metallic rotor 3 and stationary armature 16 shown in FIG. 4.

In FIG. 5, the width of salient poles 1a, 1b of magnetic rotor 1 is 180 degrees in terms of electric angle to be separated by 180 degrees. The width of magnetic poles 16a, 16b, - - - is 120 degrees in terms of electric angle. Armature coils 17a, 17b, - - - , 17f are wound around magnetic poles 16a, 16b, - - - , 16f, respectively. Armature coils 17a, 17d are connected in series as shown in the bottom of FIG. 5. In the same manner, armature coils 17b, 17e are connected in series and armature coils 17c, 17f are connected in series. Reference numerals 8a, 8d represent lead terminals of the serial joint of armature coils 17a and 17d. The lead terminals of these serial joints are represented by reference numerals 8a, 8d; 8b, 8e; 8c, 8f. These three sets of armature coils serve as first, second and third phase armature coils, respectively. Each magnetic pole is magnetized so that its polarity becomes opposite to that of the magnetic pole disposed at symmetrically opposite side.

The rotor 3, made of mild steel, has two sets of protruding portions denoted by reference numerals 3a, 3b and 3c, on the outer peripheral surface thereof. A coil 10 (refer to FIG. 6), constituting part of a position detector, is fixed on the main body side in a confronting relation to these protruding portions 3a, 3b and 3c. The coil is 3 mm in diameter and of approximately 10 turns. This coil 10 serves as a means for obtaining the position signal of salient poles 1a, 1b of rotor 1.

When rotor 3 rotates in the direction of arrow A and comes to face protruding portion 3a, the impedance becomes a minimum due to iron loss. The impedance reduces when rotor 3 faces protruding portion 3b, and then becomes a maximum at the moment rotor 3 is brought into confronting relation to protruding portion 3c. A means for detecting three-phase position detecting signals based on such physical phenomenons will be explained with reference to FIG. 6.

Figure 6:
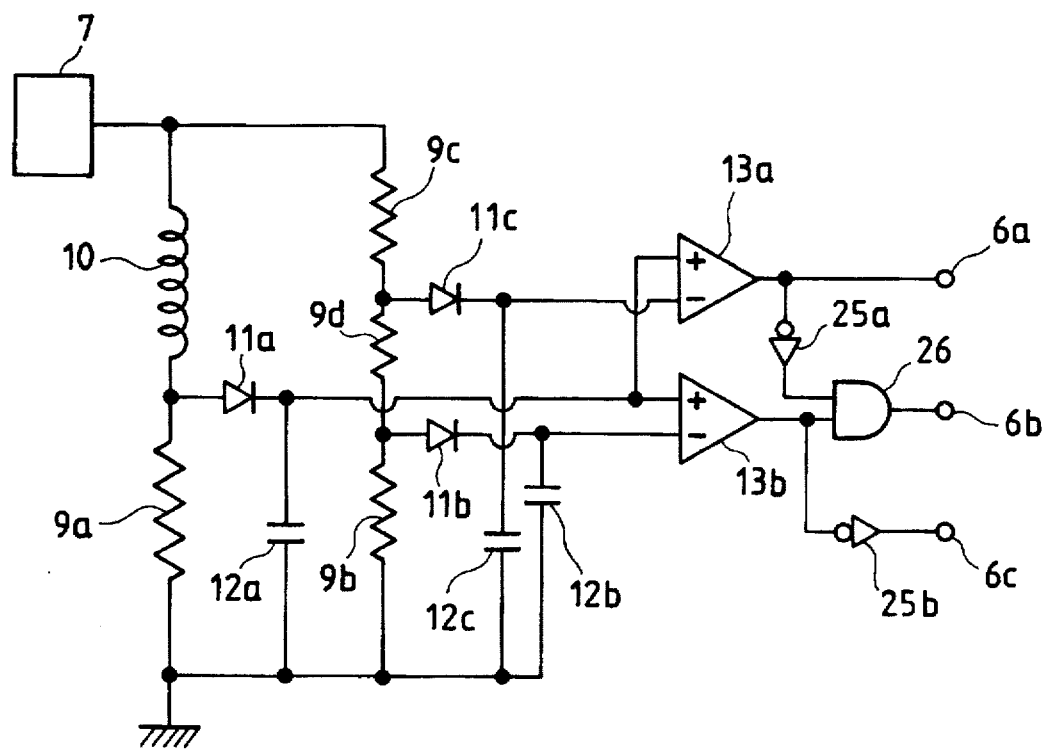
FIG. 6 is a circuit diagram showing a position detector used in the motor of FIG. 1.

In FIG. 6, coil 10 and resistances 9a, 9b and 9c constitute a bridge circuit. This bridge circuit is designed to balance when the coil 10 confronts none of protruding portions 3a, 3b, - - - . That is, the output of a low-pass filter consisting of a diode 11a and a capacitor 12a and the output of another low-pass filter consisting of a diode 11b and a capacitor 12b are equal with each other, and the output of an operational amplifier 13 becomes LOW-level. Reference numeral 7 represents an oscillator capable of generating approximately 1 Mhz oscillation. When the coil 10 confronts protruding portions 3a, 3b, - - - , the impedance decreases due to iron loss (eddy current loss and hysteresis loss), causing in a large voltage drop at resistance 9a, and, as a result, the output of operational amplifier 13b rises to a High-level.

The operational amplifier 13a, constituting the position detector shown in FIG. 6, has positive (+) and negative (−) terminals. Inputs to these positive and negative terminals will be explained, hereinafter. First, when the protruding portion 3a passes in front of the coil 10, the opposing area between the protruding portion 3a and the coil 10 becomes largest because the protruding length of the protruding portion 3a is the largest of those of other protruding portions, with the result that impedance will be minimized at this moment. Next, when the protruding portion 3b passes in front of the coil 10, the opposing area between the protruding portion 3a and the coil 10 reduces because the protruding length of the protruding portion 3b is smaller than that of protruding portion 3a, with the result that impedance will increase. Further, when the space portion 3c passes in front of the coil 10, this coil 10 does not oppose the face of the rotor 3 any more, with the result that impedance will be maximized at this moment.

When the space portion 3c passes in front of the coil 10, inputs to the positive and negative terminals of operational amplifier 13b shown in FIG. 6 are equalized, so that the output of operational amplifier 13b becomes Low-level. At this moment, the input to the negative terminal of operational amplifier 13a has been increased by the amount equivalent to the voltage drop at resistance 9d, so that the output of operational amplifier 13a has become Low-level. A diode 11c and a capacitor 12c constitute a smoothing circuit.

Figure 7:
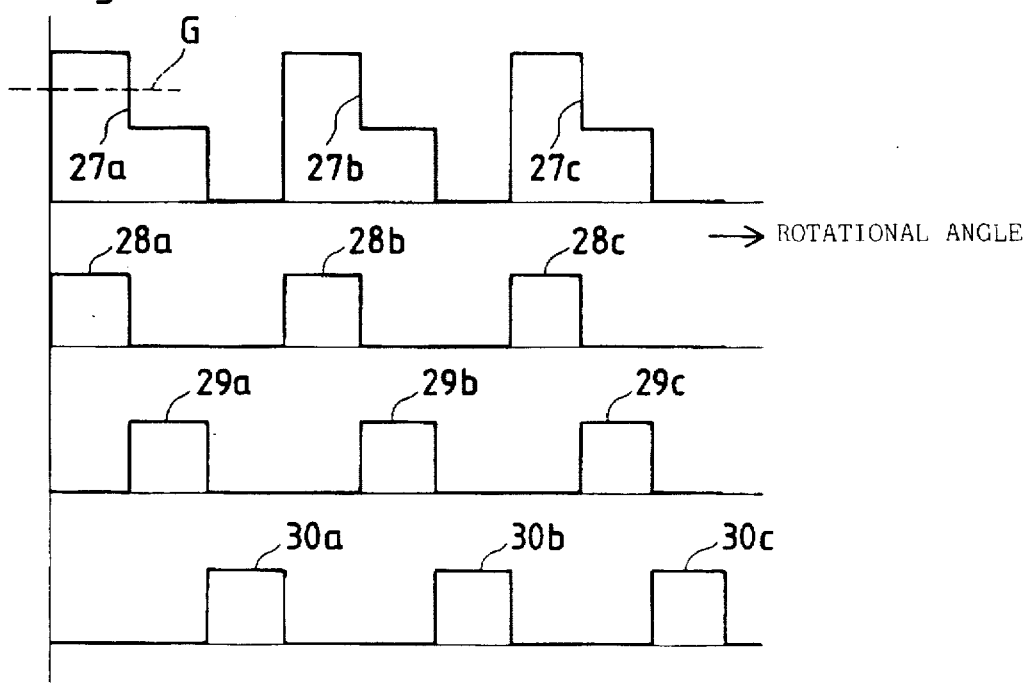
FIG. 7 is a view showing the output (position detecting signal) of the position detector shown in FIG. 6.

Being arranged as described above, the waveform of the output of operational amplifier 13b presents a graphic curve 27a shown in FIG. 7 when coil 10 is made to successively confront each of protruding portions 3a, 3b. The curve 27a has a width of 240 degrees at its bottom and 120 degrees at the height indicated by a dotted line G.

As described previously, the input to the negative terminal of operational amplifier 13a has been increased by the amount equivalent to the voltage drop at resistance 9d, so that the output of operational amplifier 13a is virtually equal with the portion exceeding the dotted line G of FIG. 7, i.e. a curve 28a of FIG. 7 having a width of 120 degrees.

The same applies to the outputs of the operational amplifiers 13b and 13a at the time when the coil 10 confronts other protruding portions. The outputs in such cases are represented by curves 27b, 27c - - - , curves 28b, 28c - - - respectively in FIG. 7. Although operational amplifier 13b generates an output of 240-degree width, the signal represented by curves 28a, 28b - - - is entered into an AND circuit 26 through an inversion circuit 25a, and hence the output of AND circuit 26 becomes as those represented by curves 29a, 29b, - - - .

The output of operational amplifier 13b, i.e. curves 27a, 27b, - - - will turn into curves 30a, 30b, - - - in FIG. 7 when inverted by the inversion circuit 25b.

As understood from the foregoing description, the outputs from terminals 6a, 6b and 6c become curves 28a, 28b, - - - , curves 29a, 29b, - - - and curves 30a, 30b, - - - in FIG. 7, respectively. Each of these curves has a width of 120 degrees. The phase difference of 120 degrees is provided between curves 28a and 29a, curves 29a and 30a, curves 30a and 28b, respectively, so as to obtain three-phase position detecting signals.

When electric current is supplied to first phase armature coils 17a, 17d in FIG. 5, salient poles 1a and 1b are magnetically attracted by magnetic poles 16a, 16d and are, therefore, rotated in the direction of arrow A. In this manner, when the rotor 1 is rotated 120 degrees, the supply of electric current to the first-phase armature coils 17a, 17d is discontinued, and, in turn, the electric current is supplied to the second-phase armature coils 17b, 17e, so that the rotor 1 is made to rotate further in the same direction (the direction of an arrow A). In the same manner, when rotor 1 has made another 120-degree rotation, electric current supply to second phase armature coils 17b, 17e is stopped to start the supply of electric current to third phase armature coils 17c, 17f, whereby rotor 1 is made to rotate further in the same direction. As apparent from the foregoing description, electric current is supplied to first, second and third phase armature coils one after another for an interval of 120 degrees, causing rotor 1 to rotate in the direction of arrow A to function as a three-phase half-wave reluctance type motor.

As explained above, magnetic rotor 1 is driven by controlling current supplied to magnetic poles 16a, 16b, - - - of stationary armature 16 opposed to this rotor 1. Hereinafter, current supply means for supplying current to the armature coils will be explained with reference to FIG. 9. Armature coils 17a, 17d are referred to as an armature coil 39a, armature coils 17b, 17e are referred to as an armature coil 39b, and armature coils 17c, 17f are referred to as an armature coil 39c. Both ends of armature coils 39a, 39b and 39c are connected with transistors 20a, 20b, transistors 20c, 20d, and transistors 20e, 20f, respectively. These transistors 20a, 20b, 20c, - - - serve as switching elements and can be replaced by other semiconductor elements. A DC electric power source supplies electric power from its positive and negative terminals 2a, 2b to armature coils 39a, 39b and 39c.

When the downside input of AND circuit 41a is high level, if high-level electric signal is inputted from terminal 42a, then transistors 20a, 20b, 20c, - - - will be turned on to activate the armature coil 39a. In the same manner, when high-level electric signals are inputted from terminals 42b and 42c, transistors 20c, 20d and transistors 20e, 20f will be turned on to activate armature coils 39b and 39c.

A terminal 40 supplies a reference voltage for specifying an exciting current. By varying the voltage of terminal 40, an output torque can be varied. When an electric power switch (not shown) is turned on, an output of an operational amplifier 40b becomes HIGH-level, since an input of a negative terminal of operational amplifier 40b is lower than that of its positive terminal, whereby transistors 20a, 20b are turned on, and a voltage is applied to the current supply control circuit of armature coil 39a. A resistance 22a is a resistance which detects the current flowing through armature coil 39a. Reference numeral 30a represents an absolute-value circuit for detecting a voltage applied between both ends of resistance 22a.

The input signal of terminal 42a is an output signal obtained from terminal 6a of FIG. 6, i.e. first phase position detecting signal. The input signals of terminals 42b and 42c are output signals obtained from terminals 6b, 6c of FIG. 6, i.e. second and third phase position detecting signals, respectively. One of above-described position detecting signal curves is shown as a curve 48a in the time chart of FIG. 8. The armature coil 39a is supplied with exciting current during a time period corresponding to the width this curve 48a. An arrow 23a of FIG. 8 shows that an angle of current supply is 120 degrees.

Figure 8:
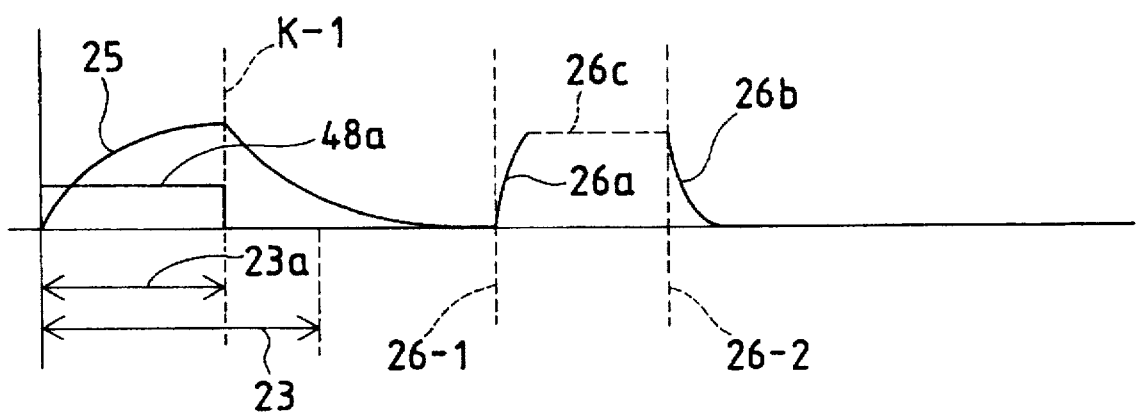
FIG. 8 is a graph comparatively showing the armature current of a conventional three-phase reluctance type motor (left side) and the armature current of a three-phase reluctance type motor in accordance with the first embodiment of the present invention (right side)
Figure 9:
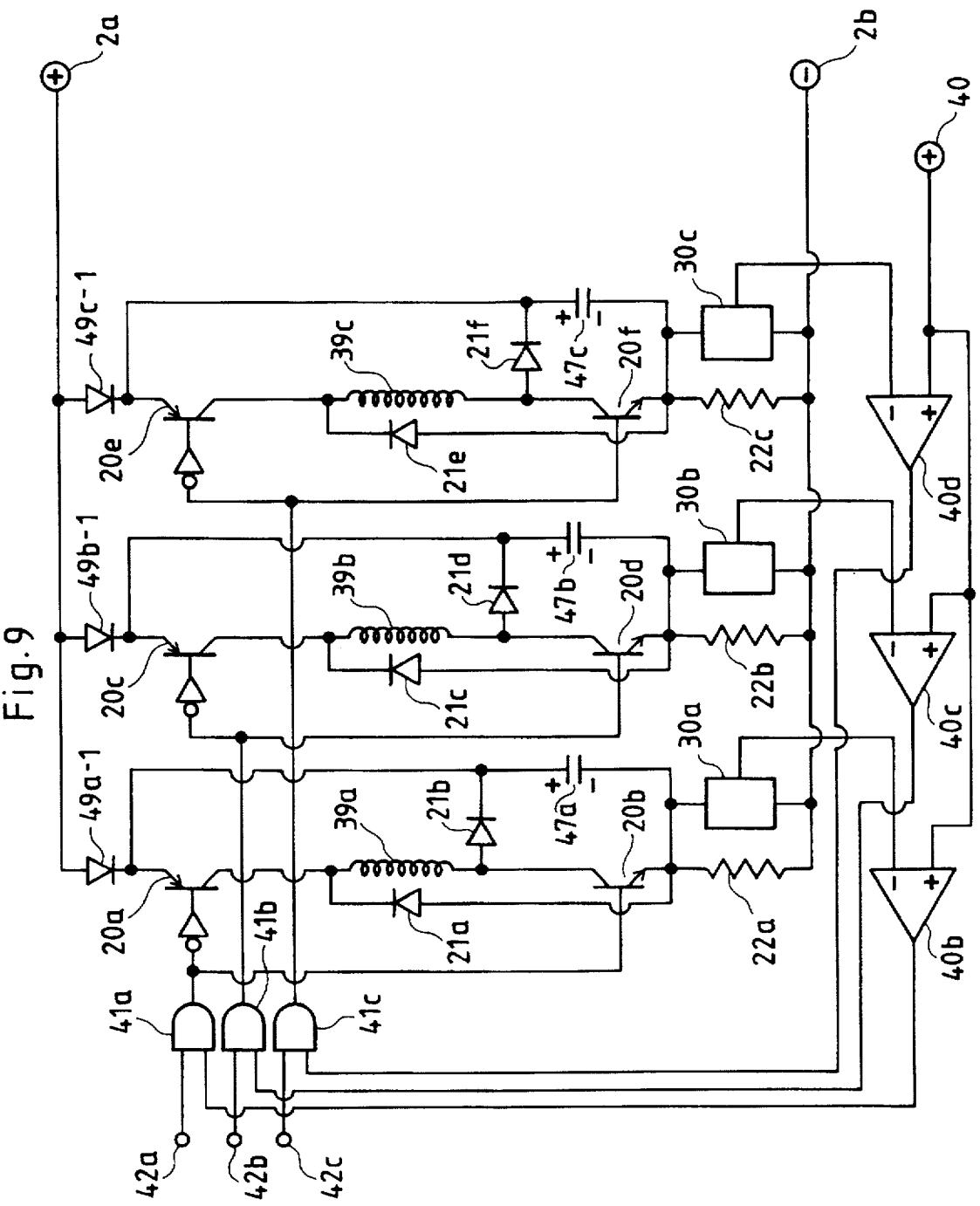
FIG. 9 is a circuit diagram showing a control circuit for supplying current to armatures of the motor shown in FIG. 1.

If the back flow preventing diode 49a-1 is omitted from the current supply circuit shown in FIG. 9, the current which flows through the armature coil 39a will rise slowly at the initial stage of current supply, due to the inductance of the armature coil 39a, as represented by the curve on the left side of the dotted line K-1 in FIG. 8. If the current is stopped, magnetic energy stored in the armature coil 39a is discharged to the electric power source through diodes 21a, 21b. Therefore, the current decreases gradually as shown by the second-half portion of curve 25, i.e. the right side of dotted line K-1. The section where positive torque is generated is a 180-degree section indicated by an arrow 23. However, the second half of curve 25 extends out of this section; therefore, a counter torque is generated so that both output torque and efficiency are decreased.

The time width of the counter torque generating section (i.e. a specific section exceeding the 180-degree position in the section during which electric current flows through the armature coil) will remain unchanged even if the motor is driven at high speeds. However, the positive torque generating section 23 decreases in proportion to the rotational speed of the motor. Hence, the counter torque generating section expands as the rotational speed of the motor increases, causing the output torque to decrease until the motor will become unable to operate in the high-speed region.

The same condition applies to the current supply operation for the armature coils 39b, 39c based on other position detecting signals.

Furthermore, the above-described slow rise of curve 25 also causes drop of an output torque or occurrence of torque reduction. The slow rise of current flowing through armature coil 39a is caused by a large inductance which is generated by closing of magnetic path with the magnetic poles and the salient poles.

The reluctance type motor is advantageous in being capable of generating a large output torque, but disadvantageous in being incapable of increasing the rotational speed. This disadvantage is due to the counter torque and the above-described torque reduction. In order to overcome such a disadvantage, there is a known method, in which phase advancing is performed before a salient pole enters the area of a magnetic pole to start supply of current to the armature coil.

The armature current will rise sharply if phase advancing is performed, because of small inductance of a magnetic pole. However the inductance will increase abruptly as soon as a salient pole begins to confront a magnetic pole, with the result that the armature current will reduce sharply. That causes a disadvantage of reduction of output torque.

Thus, the present invention, intending to overcome the foregoing shortcoming of the prior art, is characterized by that the current supply control circuit for the armature includes the back flow preventing diodes 49a-1, 49b-1, 49c-1 and capacitors 47a, 47b and 48c, as shown in FIG. 9.

According to the present invention, when the current to armature coil 39a is terminated at the end of curve 25a, magnetic energy stored in the armature coil 39a is discharged through diodes 21b, 21a to the capacitor 47a so as to charge it up to a high voltage with polarities shown in FIG. 9, being prevented from returning to the DC becomes LOW level. Thus, transistors 20a, 20b are turned off and the exciting current is decreased. Due to hysteresis characteristics of the operational amplifier 40b, the output of the operational amplifier 40b returns to HIGH level after the exciting current has decreased by a predetermined amount. The transistors 20a and 20b are, then, turned on to increase the exciting current. By repeating such a cycle, the exciting current is maintained at a predetermined value. A section indicated by the curve 26c in FIG. 8 is a chopper-controlled section. The height of curve 26c is regulated by the voltage of the reference voltage terminal 40. The armature coil 39b in FIG. 9 is activated by the transistors 20c and 20d, which are turned on in response to the position detecting signal supplied from the terminal 42b, and undergoes a chopper control by an operational amplifier 40c, a resistance 22b, an absolute-value circuit 30b, and an AND circuit 41b. Functions and effects of diode 49b-1 and capacitor 47b are the same as those of the armature coil 39a. The same conditions will therefore be applicable to the armature coil 39c. The armature coil 39c is activated in response to the position detecting signal supplied from the terminal 42c. Functions and effects of transistors 20e, 20f, an AND circuit 41c, an operational amplifier 40d, a resistance 22c, an absolute-value circuit 30c, an diode 49c-1 and a capacitor 47c are the same as those in the previously explained case.

Figure 10:
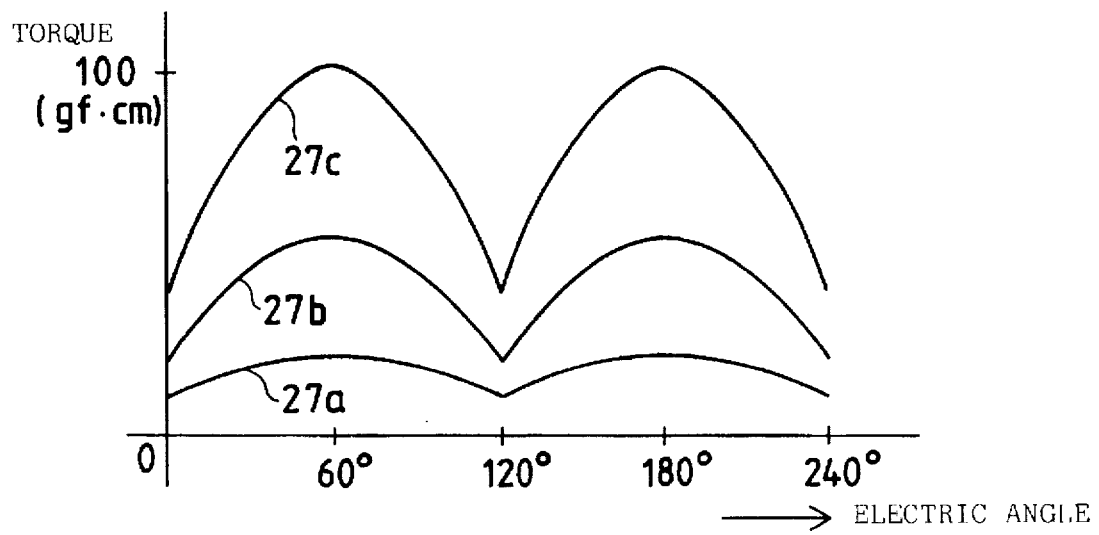
FIG. 10 is a graph showing the output torque of the motor of FIG. 1 in relation to the rotational angle of its rotor.

FIG. 10 shows torque curves of the three-phase reluctance type motor in accordance with the first embodiment of the present invention, wherein the abscissa represents the rotational angle of the rotor and the electric power source side by the presence of back flow preventing diode 49a-1. Accordingly, the magnetic energy declines sharply and the current decreases steeply.

Curves 26a, 26b, and 26c shown in the time chart of FIG. 8 cooperatively represent the curve of current flowing through armature coil 39a in the current supply control circuit of FIG. 9. The section defined by the dotted lines 26-1 and 26-2 is 120 degrees wide. The armature current decreases steeply as shown by curve 26b so that generation of counter torque is prevented. Capacitor 47a is charged up to a high voltage and held at this voltage. Next, in response to the position detecting signal, the transistors 20a, 20b are turned on to activate the armature coil 39a again. A voltage equivalent to a summation of the charged voltage of capacitor 47a and the DC electric power source voltage (a voltage applied between terminals 2a, 2b) is applied to the armature coil 39a in this case; therefore, the current in the armature coil 39a rises sharply. By virtue of this phenomenon, the armature current builds up quickly as shown by curve 26a. As explained above, the generation of torque reduction and the counter torque are eliminated, and the output torque is increased as the armature current has a waveform approximating to rectangular.

Next, a chopper circuit will be explained. When the current flowing through the armature coil 39a increases and then the voltage drops at the resistance 22a, which detects the armature current value, increases to exceed the voltage of the reference voltage terminal 40 (i.e. an input voltage of the positive terminal of the operational amplifier 40b), a downside input of the AND circuit 41a ordinate represents the output torque. Curves 27a, 27b and 27c represent output torques corresponding to the armature currents of 1, 1.5 and 2 amperes, respectively. A diameter of the rotor is 60 mm. An outer diameter of the stationary armature is 50 mm. The ripple torque is approximately 70%. A trough of each torque curve occurs at the 120-degree position where the edge of a salient pole first encounters the edge of a magnetic pole. If such a trough of the torque curve becomes a problem in an intended use of present invention, it will be preferable to provide two sets of stationary armatures in such a manner that the phases of the corresponding magnetic poles are offset from each other by 60 degrees in terms of electric angle in order to reduce the ripple torque. In this case, only one magnetic rotor will be used.

Figure 11:
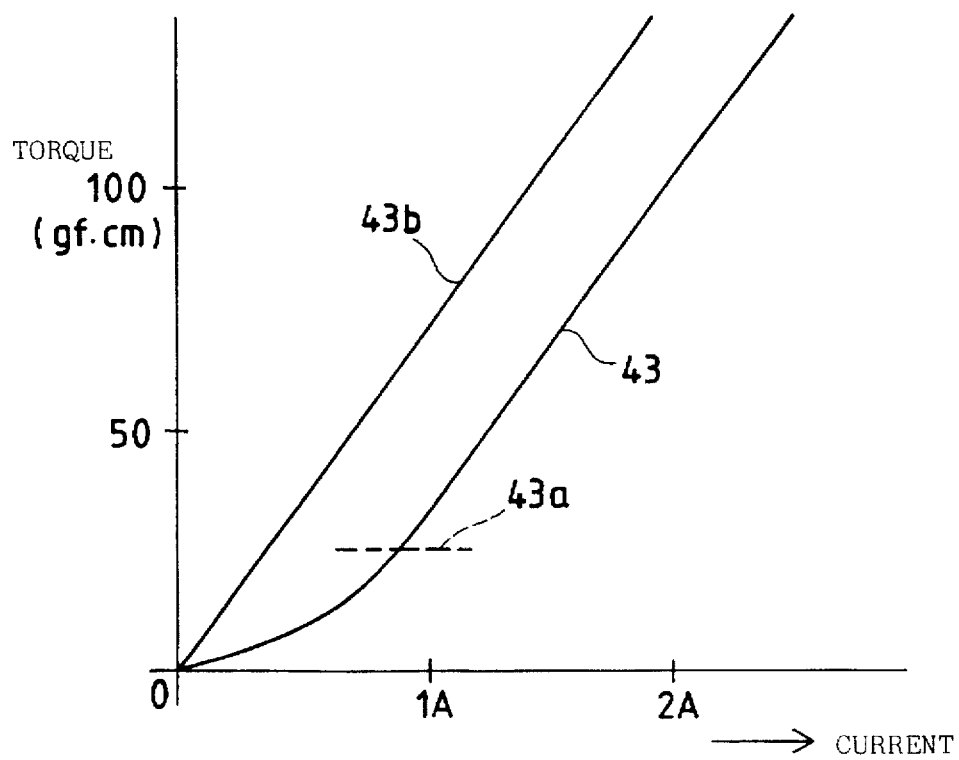
FIG. 11 is a graph showing the output torque of the motor of FIG. 1 in relation to the armature current.

FIG. 11 is a graph showing output torque curves, wherein the ordinate represents the torque and the abscissa represents the armature current. The curve 43 represents the output torque curve obtained when the air gap between the saline poles and the magnetic poles is 0.2 mm. The curve 43 is a square curve in the region below the dotted line 43a and is a straight line in the remaining region above the dotted line 43a. Hence, the torque increases linearly in proportion to the armature current in the latter region. Therefore, torque can be increased until the armature coil is burnt, having no saturation point.

When the air gap between the magnetic poles and the salient poles is 0.1 mm or less, the torque increases linearly as shown by a straight line 43b, having no saturation point.

Next, a three-phase reluctance type motor in accordance with a second embodiment of the present invention will be explained with reference to FIGS. 12 and 13.

Figure 12:
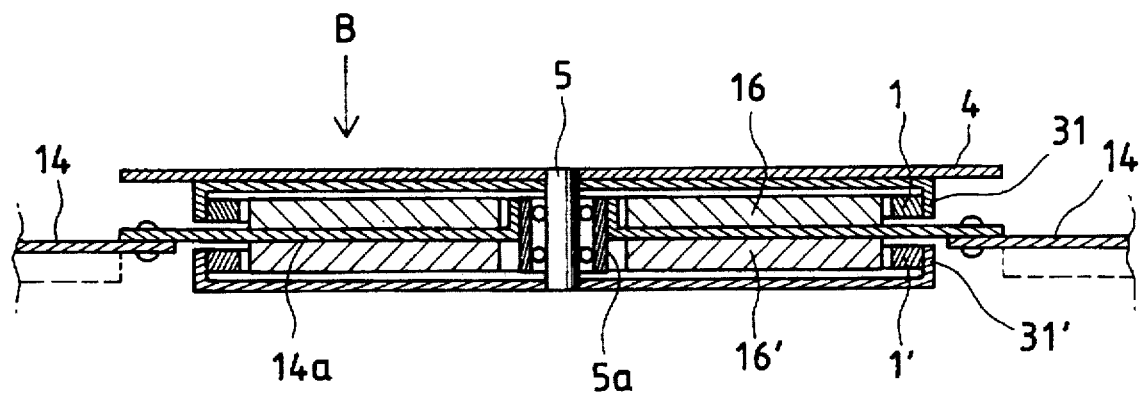
FIG. 12 is a transversal cross-sectional view showing a three-phase reluctance type motor in accordance with a second embodiment of the present invention.

In FIG. 12, reference numeral 14 represents a substrate, such as that of a printed circuit board, on which an electric motor in accordance with the embodiment of the present invention is mounted. The substrate 14 has a circular hole around which the outer periphery of a disk-shaped flat plate 14a made of mild steel is fixed. A ball bearing 5a is fixed to he central portion of the flat plate 14a. Furthermore, stationary armatures 16 and 16' are fixed on and beneath the flat plate 14a.

Rotating shaft S is rotatably supported by a bearing 5a. Cup-shaped rotors 31 and 31', made of mild steel, are fixed to the upper and lower ends of rotational shaft 5 with their centers coinciding with the axis of rotational shaft 5. Magnetic rotors 1 and 1', made of laminated layers of mild steel plates, are fixed inside the peripheral flange of these rotors 31 and 31', respectively. A circular plate 4 for mounting a load, such as a floppy disk, thereon is mounted on the upper surface of upper rotor 31 for synchronous rotation with rotor 31. Upper and lower portions of flat plate 14a are structurally identical; therefore, only the upper portion will be explained hereinafter with reference to FIG. 13 showing a view seen from the direction of an arrow B.

Figure 13:
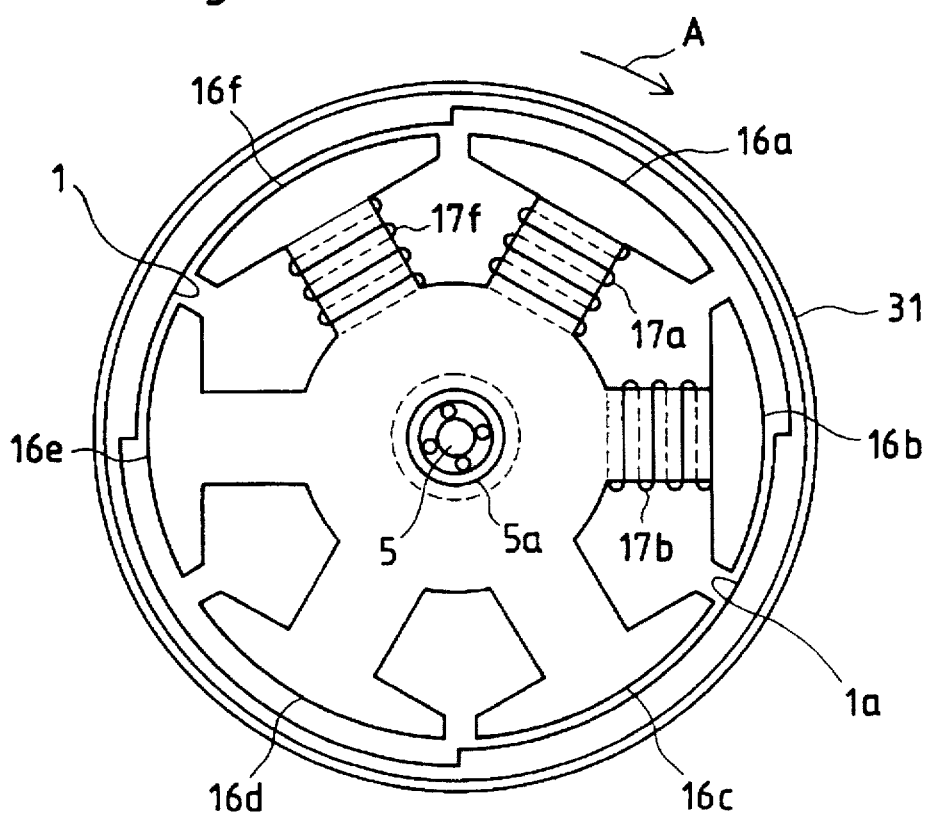
FIG. 13 is a view illustrating a ball bearing portion adopted in the motor shown in FIG. 12.

In FIG. 13, the stationary armature has magnetic poles 16a, 16b, - - - , 16f, each having the width of 120 degrees in terms of electric angle. The core of the stationary armature is composed of four laminated layers of 0.3 mm thick silicon steel sheets. Armature coils 17a, 17b, - - - , 17f are wound around magnetic poles 16a, 16b, - - - , 16f, respectively, as shown by dotted lines in the drawing. After finishing winding of these coils, the stationary armature is molded in plastic and shaped into a disk as shown by reference numeral 16 in FIG. 12. Magnetic rotor 1 is made of laminated layers of silicon steel plates and identical in thickness with the core of the armature coil which is also made of laminated layers of silicon steel plates. The magnetic rotor 1 has salient poles 1a, 1b, the width of which is 180 degrees in terms of electric angle. Adjacent two salient poles are spaced by 180 degrees.

That is, stationary armatures 16, 16' and magnetic rotors 1, 1' are structurally identical with the stationary armature coil 16 and the magnetic rotor 1 of the first embodiment.

The present invention can also be implemented in the case of a motor having three or four salient poles 1a, 1b and nine or twelve magnetic poles 16a, 16b, - - - . Supplying electric current to armature coils 17a, 17b, - - - will cause the salient poles 1a, 1b of magnetic substance to be attracted by the magnetic attraction force, thereby causing rotors 31 and 31' to rotate in one direction. Regarding the rotation of rotors 31, 31' of the motor in this embodiment, the same explanation applies to the rotor 3 of the motor in the first embodiment, and so detailed explanation thereof will be omitted.

In short, the development showing the stationary armature and the magnetic rotor of the motor in this embodiment will be the same as that of FIG. 5 (although reference numeral 3 of FIG. 5 needs to be replaced by reference numeral 31 in the second embodiment). This embodiment uses the same position detector as is shown in FIG. 6, which generates the same output as is shown in FIG. 7. The motor of this embodiment will have an armature current as is shown in the right side of FIG. 8. The current supply control circuit to supply electric current to the motor in this embodiment is as shown in FIG. 9.

Figure 14:
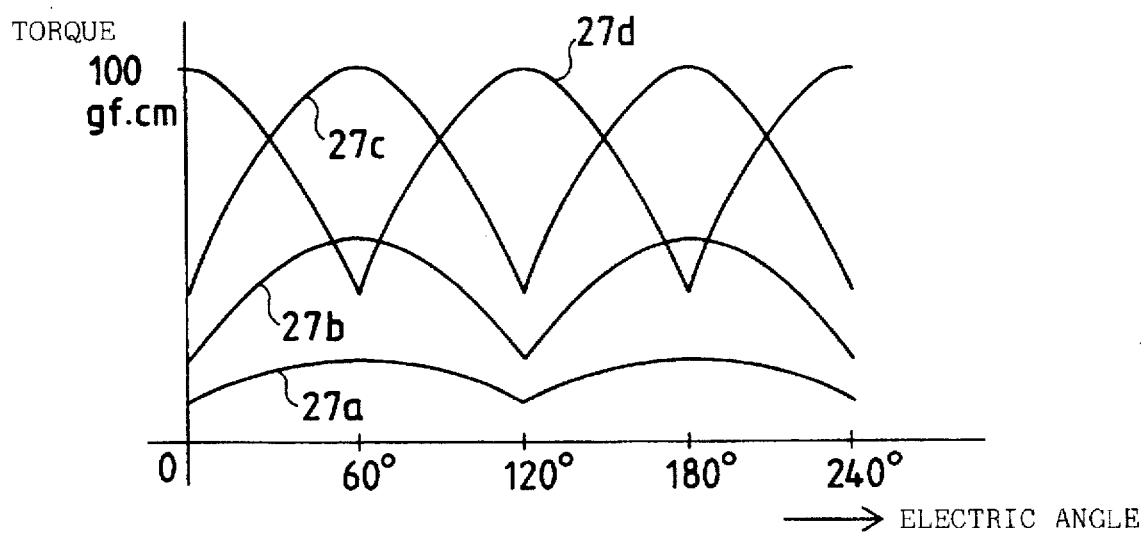
FIG. 14 is a graph showing the output torque of the motor of FIG. 12 in relation to the rotational angle of its rotor.

FIG. 14 shows torque curves of the three-phase reluctance type motor in accordance with the second embodiment of the present invention, wherein the abscissa represents the rotational angle of the rotor and the ordinate represents the output torque. Curves 27a, 27b and 27c represent output torques of rotor 31 of FIG. 12 corresponding to the armature currents of 1, 1.5 and 2 amperes, respectively. A diameter of the rotor is 60 mm. An outer diameter of the stationary armature is 50 mm. The ripple torque is approximately 70%. A trough of the torque curve appears at the 120-degree point where the edge of a salient pole encounters the edge of a magnetic pole. If such a trough of the torque curve becomes a problem in an intended use, it will be preferable to provide two sets of stationary armatures (16, 16') in such a manner that the phases of the corresponding magnetic poles are offset from each other by 60 degrees in terms of electric angle, so as to reduce the ripple torque. The electric angle of 60 degrees corresponds to an angle between adjacent two of magnetic poles 16a, 16b, - - - (refer to FIGS. 13 and 5).

As shown in FIG. 12, the present embodiment comprises another set of stationary armature 16' and rotor 31' in addition to a set of stationary armature 16 and rotor 31, thereby constituting a three-phase full-wave reluctance type motor. The phases of magnetic poles of stationary armature 16 are offset by 60 degrees from those of corresponding magnetic poles of another stationary armature 16', so that the torque ripple can be reduced. In FIG. 14, curve 27d represents the output torque of rotor 31' (at the armature current of 2 ampere). Peaks and troughs of curve 27c just correspond to troughs and peaks of curve 27d, respectively. Accordingly this composite torque will effectively include small ripple torque component.

According to the second embodiment, the output torque curve of the motor is identical with that of the first embodiment, as shown in FIG. 11.

As explained above, the present invention provides a motor capable of obtaining a practical output torque and increasing the rotational speed while maintaining the efficiency at an adequate value, even if the width of the motor is flattened less than 5 mm.

Therefore, the construction can be so simplified and preferable for mass production.

What is claimed is:

1. A flat, three-phase, reluctance type motor, comprising:

a flat disk-shaped stationary armature, made of laminated layers of silicon steel plates, having a circumferential surface on which there are disposed first, second and third phase magnetic poles each having a width of 120 degrees in terms of electric angle;

first, second and third phase armature coils wound around said first, second and third phase magnetic poles, respectively;

a flat cup-shaped metallic rotor having inner and outer peripheral surfaces at a cup end of the metallic rotor, and having a rotational shaft;

a magnetic rotor, made of laminated layers of silicon steel plates, fixed to the inner peripheral surface of the metallic rotor;

an even number of salient poles protruding from an inner peripheral surface of said magnetic rotor, each having a width of 180 degrees and spaced apart by 180 degrees, in terms of electric angle, from the adjacent pole;

means for rotatably supporting the rotational shaft of said metallic rotor by a bearing disposed at the center of said stationary armature, so as to keep an outer peripheral surface of said magnetic poles always opposing an inner peripheral surface of said salient poles with a slight air gap therebetween when said rotational shaft is rotated;

a single position detecting coil fixed on a main body, having a coil surface opposing the outer peripheral surface of said metallic rotor with a slight air gap therebetween;

a position detecting device for obtaining position detecting signals of said first, second and third phase salient poles by utilizing an impedance change in said position detecting coil which is generated in response to a change in distance between said position detecting coil and said outer peripheral surface of said metallic rotor which occurs when the metallic rotor rotates 120-degrees in terms of electric angle;

semiconductor switching elements connected in series with said first, second and third phase armature coils, respectively;

a DC electric power source for supplying electric power to serial joints of said first, second and third armature coils and a corresponding semiconductor switching element;

a current supply control circuit for supplying current to said first, second and third phase armature coils by turning on the corresponding semiconductor switching elements connected in series with said first, second and third phase armature coils in response to said first, second and third phase position detecting signals, respectively for a time corresponding to a signal width of each position detecting signal;

an electric circuit for transferring magnetic energy stored in the first, second and third armature coils from connecting points of the semiconductor switching elements and said first, second and third armature coils though a diode to a small-capacitance capacitor when the corresponding semiconductor switching element is turned off at a trailing edge of the position detecting signal, and holding the charged energy in said capacitor, thereby quickly reducing current supplied to said armature coil; and another electric circuit designed for discharging the charged energy back to the first, second and third armature coils when the first, second and third armature coils are to again be supplied with current so that the current to be supplied may rise sharply.

2. The flat, three-phase, reluctance type motor according to claim 1, wherein said motor is composed of a set of said magnetic rotor and two sets of said stationary armature, the phases of the magnetic poles of one of these two stationary armatures being offset by a predetermined angle with respect to the phases of the magnetic poles of the other.

3. The flat, three-phase, reluctance type motor according to claim 1, wherein said stationary armature is formed into a disk together with said armature coils by plastic molding.

4. A flat, three-phase, reluctance type motor, comprising:

first and second stationary armatures, flatly disk-shaped and made of laminated layers of silicon steel plates, having a circumferential surface on which there are disposed first, second and third phase magnetic poles each having a width of 120 degrees in terms of electric angle, the first, second and third phase magnetic poles on the first and second stationary armature being spaced apart by a spacing angle from adjacent magnetic poles;

means for mutually fixing said first and second stationary armatures so that their phases are offset by an amount equivalent to a half of the spacing angle;

first, second and third phase armature coils wound respectively around the first, second and third phase magnetic poles of said first stationary armature, and another first, second and third phase armature coils wound respectively around the first, second and third phase magnetic poles of said second stationary armature, a single bearing provided at the centers of said first and second stationary armatures;

first and second flat cup-shaped metallic rotors, each having inner and outer peripheral surfaces at a cup end of the metallic rotor;

a magnetic rotor, made of laminated layers of silicon steel plates, fixed to the inner peripheral surfaces of each of the first and second metallic rotors;

an even number of salient poles protruding from an inner peripheral surface of each of said magnetic rotors, each pole having a width of 180 degrees in terms of electric angle, and being spaced apart from adjacent poles by 180 degrees, the number of magnetic poles being three times the number of salient poles;

a rotational shaft having one end fixed to said first metallic rotor and the other end fixed to said second metallic rotor, the rotational shaft being rotatably supported by said bearing, allowing an outer peripheral surface of said magnetic poles to always oppose a inner peripheral surface of said salient poles with a slight air gap therebetween when said rotational shaft is rotated;

first and second position detecting coils which are fixed to a main body in a manner such that they oppose the outer peripheral surfaces of said first and second metallic rotors respectively with a slight air gap therebetween;

a position detecting device for obtaining two sets of first, second and third phase position detecting signals indicating the position of said salient poles respectively provided on said first and second metallic rotors by utilizing impedance changes in said first and second position detecting coils which are generated in response to changes in distance between said first and second position detecting coils and the outer peripheral surfaces of said first and second metallic rotors as said first and second metallic rotors rotate 120-degrees in terms of electric angle;

semiconductor switching elements connected in series with said first, second and third phase armature coils of said first and second stationary armatures, respectively;

a DC electric power source for supplying electric power to serial joints of said armature coils and the respective semiconductor switching element;

a current supply control circuit for supplying current to said first, second and third phase armature coils of said first and second stationary armatures by turning on the corresponding semiconductor switching elements connected in series with said first, second, third phase armature coils in response to the two sets of first, second and third phase position detecting signals obtained from said first and second position detecting coils for a time corresponding to a signal width of each position detecting signal;

an electric circuit for transferring magnetic energy stored in the first, second and third armature coils on the first and second stationary armatures from connecting points of the semiconductor switching elements and said armature coils though a diode to a small-capacitance capacitor when the corresponding semiconductor switching element is turned off at a trailing edge of the position detecting signal, and holding the charged energy in said capacitor, thereby quickly reducing current supplied to said armature coil; and another electric circuit designed for discharging back to the first, second and third armature coils on the first and second stationary armatures the charged energy held therefore when the first, second and third armature coils on the first and second armatures are to again be supplied with current so that the current to be supplied may rise sharply.

5. The flat, three-phase, reluctance type motor defined by claim 4, wherein said means for fixing said first and second stationary armatures comprises a flat plate which is larger in diameter than said first and second stationary armatures so that said flat plate is sandwiched between said first and second stationary armatures and integrally formed with said first and second stationary armatures by plastic molding.

6. The flat, three-phase, reluctance type motor defined by claim 1, further comprising a chopper circuit incorporated in said current supply control circuit, said chopper circuit being designed to repeat the steps of detecting current flowing through a concerned armature coil and turning off the switching element interposed between said armature coil and each of positive and negative terminals of said DC electric power source when the detected current exceeds a first predetermined level, and turning on said switching element when the current flowing through said armature coil falls below a second predetermined level.

* * * * *